(12) United States Patent
Miller et al.

(10) Patent No.: US 6,423,802 B1
(45) Date of Patent: *Jul. 23, 2002

(54) WATER SOLUBLE COPOLYMERS AND POLYMER COMPOSITIONS COMPRISING SAME AND USE THEREOF

(75) Inventors: Edward Miller, Plano; William J. Benton, Magnolia, both of TX (US)

(73) Assignees: Cabot Corporation, Billerica, MA (US); Frtiz Industries, Inc., Mesquite, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/316,527

(22) Filed: May 21, 1999

(51) Int. Cl.[7] ................ C08F 16/30; C08F 20/02
(52) U.S. Cl. ............... 526/287; 526/328; 507/229; 507/225; 507/925; 507/906
(58) Field of Search ................ 526/287, 328; 507/229, 225, 925, 906

(56) References Cited

U.S. PATENT DOCUMENTS

| | | | |
|---|---|---|---|
| 3,679,000 A | * | 7/1972 | Kaufman .............. 166/273 |
| 4,502,964 A | | 3/1985 | Giddings et al. |
| 4,521,578 A | | 6/1985 | Chen et al. |
| 4,536,297 A | | 8/1985 | Loftin et al. |
| 4,544,719 A | | 10/1985 | Giddings et al. |
| 4,555,558 A | | 11/1985 | Giddings et al. |
| 4,609,476 A | | 9/1986 | Heilweil |
| 4,622,373 A | | 11/1986 | Bardoliwalla |
| 4,647,859 A | | 3/1987 | Son et al. |
| 4,699,225 A | | 10/1987 | Bardoliwalla |
| 4,741,843 A | | 5/1988 | Garvey et al. |
| 4,900,457 A | | 2/1990 | Clark-Sturman et al. |
| 4,959,163 A | | 9/1990 | Holtmyer et al. |
| 5,008,025 A | | 4/1991 | Hen |
| 5,028,341 A | | 7/1991 | Liao |
| 5,032,295 A | | 7/1991 | Matz et al. |
| 5,134,118 A | | 7/1992 | Patel et al. |
| 5,204,320 A | | 4/1993 | Patel et al. |
| 5,379,841 A | | 1/1995 | Pusch et al. |
| 5,480,863 A | | 1/1996 | Oakley et al. |
| 5,620,947 A | * | 4/1997 | Elward-Berry ............ 507/229 |
| 5,712,356 A | | 1/1998 | Bothe et al. |
| 5,880,236 A | | 3/1999 | Konrad et al. |
| 5,936,052 A | | 8/1999 | Bothe et al. |
| 5,989,570 A | | 11/1999 | Lion et al. |

FOREIGN PATENT DOCUMENTS

| | | |
|---|---|---|
| CA | 2105184 | 2/1994 |
| DE | 19840632 | 3/2000 |
| EP | 0068189 | 8/1982 |
| EP | 0 371 616 B1 | 3/1993 |
| EP | 0572113 | 12/1993 |
| EP | 0 583 814 A1 | 2/1994 |
| EP | 0 473 920 B1 | 10/1994 |
| EP | 0621329 | 10/1994 |
| EP | 0 645 429 A1 | 3/1995 |
| EP | 0 655 470 B1 | 5/1995 |
| EP | 0 668 294 B1 | 8/1995 |
| EP | 0 456 820 B1 | 4/1996 |
| EP | 0 558 612 B1 | 10/1996 |
| EP | 0 800 541 B1 | 10/1997 |
| EP | 0 815 849 B1 | 6/1999 |
| GB | 1549734 | 1/1979 |
| WO | WO9604348 | 2/1996 |
| WO | WO9923188 | 5/1999 |

OTHER PUBLICATIONS

International Search Report in PCT US00/13727.
Written Opinion dated May 25, 2001 in corresponding PCT/US0013727.

* cited by examiner

Primary Examiner—David W. Wu
Assistant Examiner—Ling-Siu Choi

(57) ABSTRACT

Novel polymer compositions are disclosed, along with their use as well service fluids, for example as completion fluids, work-over fluids or drilling fluids, comprising water soluable copolymers having sulfonate groups and carboxylate groups, along with alkali metal salts of carboxylic acid. Exemplary copolymer has 5 to 95 wt. % structural units derived from 2-acrylamido-2-methylpropanesulfonic acid or salt thereof, and 5 to 95 wt. % structural units derived from acrylic acid or salt thereof. A salt of the polymer may be used, such as the sodium, potassium, ammonium and calcium salts. Exemplary alkali metal salts of the polymer composition include sodium, potassium and cesium salts of formic acid and/or acetic acid in amounts suitable to develop high temperature viscosity suitable for such well servicing fluids. The polymer composition is hydrateble/soluble in a brine of sodium and/or potassium and/or cesium salts of formic and/or acetic acid.

4 Claims, 2 Drawing Sheets

WATER SOLUBLE COPOLYMERS AND POLYMER COMPOSITIONS COMPRISING SAME AND USE THEREOF

INTRODUCTION

This invention relates to certain polymer compositions, their preparation and their use as viscosifiers in alkali metal salt solutions which are particularly useful in viscosifying well-drilling fluids for oil field operations at temperatures above 350° F.

DESCRIPTION

It is known to use aqueous polysaccharide compositions in well-drilling operations, e.g. in oil and gas wells. Examples of polysaccharides include cellulose derivatives, such as carboxyethylcellulose, carboxymethylcellulose, carboxymethylhydroxyethylcellulose, alkylhydroxyalkylcelluloses, alkylcelluloses, alkylcarboxyalkylcelluloses and hydroxyalkylcelluloses (particularly hydroxyethylcellulose); and microbial polysaccharides such as Succinoglycan polysaccharides, Scleroglucan polysaccharides and Xanthan polysaccharides.

In order to achieve suitable density for use in well-drilling operations, it is conventional for the known aqueous polysaccharide compositions to include water soluble salts, e.g. as described in UK Patent No. 1,549,734. These salts are typically halide salts (e.g. chlorides and bromides) of mono- or divalent cations, such as sodium, potassium, calcium and zinc, e.g. sodium chloride, potassium chloride, calcium bromide or zinc bromide.

One problem faced in drilling operations relates to thermal stability of well service fluids such as completion fluids, work-over fluids and drilling fluids. Temperatures in sub-surface formations generally rise approximately 1 degree C. per hundred feet (30 meters) depth. Any aqueous polysaccharide composition has its own characteristic temperature above which it undergoes severe chemical degradation with undesirable reduction of viscosity, thus imposing limitations upon its use in drilling operations below a corresponding depth.

Additives, for example blends of polymeric alkaline materials such as that sold by International Drilling Fluids (UK) Ltd., under the trade mark "PTS 200," have been used to improve thermal stability of aqueous polysaccharide compositions.

Polymer compositions have now been found that have excellent thermal stability and excellent performance characteristics for use in well service fluid applications. Novel polymer/alkali metal carboxylate compositions disclosed here are suitable for use in aqueous well servicing fluids and incorporate high molecular weight copolymer soluble in brine. Adding salt to a solution of polymer in water is a known method of removing the polymer from solution. The highest molecular weights will come out of solution first and, as more and more salt is added, lower and lower molecular weight polymers come out of solution. In contrast, in the novel aqueous polymer compositions disclosed here, the high molecular weight copolymer, further described below, is sufficiently soluble in brine comprising alkali metal carboxylate to develop suitable high temperature viscosity, that is, viscosity at the elevated temperatures encountered by well drilling fluids. Moreover, in accordance with at least certain preferred embodiments, the polymer compositions have "durable" viscosity, that is, advantageous density and excellent high temperature viscosity is maintained even after prolonged working of the well service fluid. The polymer compositions disclosed here comprise water soluble copolymer having functionality which includes at least sulfonate groups and carboxylate groups. The copolymer is sufficiently soluble in saturated and other high concentration brines of alkali and metal salt(s) of carboxylic acid(s), for example, cesium formate brine, to provide polymer compositions having good density and excellent high temperature viscosity for well servicing fluids.

According to one aspect of the present invention, there is provided aqueous polymer compositions comprising the aforesaid copolymer having at least sulfonate group and carboxylate group functionality, dissolved in brine for use as well-service fluids, such as completion fluids, work-over fluids, and drilling fluids. Preferably, such soluble copolymer is polymerization reaction product of acrylamidomethylpropanesulfonic acid or salt thereof with acrylic acid and/or alkali metal salts or ammonium salts of carboxylic acid or other suitable unsaturated carbonyl compounds (e.g. alpha, beta-unsaturated carbonyl compounds).

In accordance with another aspect, an aqueous polymer composition comprises water soluble copolymer having functionality including at least sulfonate groups and carboxylate groups, and alkali metal salt of carboxylic acid.

It will be apparent to those skilled in the art that incidental quantities of other salts, such as sulfates, nitrates and bicarbonates, may also be present in compositions of the invention, and inevitably will be present in compositions where sea water or other naturally occurring brine is used in preparing the composition. If desired the composition may also contain an antioxidant, e.g. 2-mercaptobenzothiazole and/or other suitable additives. When 2-mercaptobenzothiazole is used it may conveniently be incorporated in the same proportion, w/v, as the water soluble copolymer. Those skilled in the art will appreciate that 1% w/v corresponds to a concentration of 10 kgm.sup.−3 (10 g/l) of composition. It is advantageous for the pH of the composition to be preferably greater than 8.0, but not higher than 11.5, preferably at least 9.0 and less than 10.5, for reasons of stability and reduced corrosiveness of the composition. The pH may be controlled by addition of suitable reagents, e.g. sodium hydroxide. The presence of a monovalent salt, e.g., a carbonate salt, e.g. potassium carbonate or cesium carbonate, in the composition can enable a suitable buffering effect to be achieved.

The invention also provides a process of preparing an aqueous polymer composition of the invention. In accordance with one aspect, the alkali metal salt of carboxylic acid is added to an aqueous composition, optionally a brine composition, in which the water soluble copolymer is already dissolved and hydrated. In accordance with one preferred embodiment, the alkali metal salt of formic, acetic and/or other suitable carboxylic acid is added to an aqueous composition containing the water soluble copolymer with, when present, other salts and/or other ingredients, etc. In accordance with an alternative embodiment, the polymer composition described above comprising the water soluble copolymer and the alkali metal salt of carboxylate acid, optionally with other dry ingredients, intended for use in a well service fluid, is provided as a dry powder to which water or brine solution is added to hydrate the polymer and dissolve the alkali metal salt of carboxylic acid. In accordance with another alternative embodiment, the water soluble copolymer is added to a brine comprising the alkali metal salt.

In accordance with certain preferred embodiments, the brine employed in an aqueous polymer composition of this invention contains primarily sodium or potassium salt of carboxylic acid, although as mentioned above, other salts may be present in trace or minor amounts. Typically, such brines are substantially saturated solutions of the sodium or potassium salt. In other preferred embodiments, the cesium salt of carboxylic acid is used with only trace or minor amounts of other salts. Such cesium brines provide aqueous polymer compositions of higher density than corresponding compositions employing sodium or potassium brines. More specifically, for example, aqueous polymer compositions of the invention employing cesium brines above about 40% to 43% w/v (i.e., 4 parts by weight of cesium salt to 10 parts by weight of water used in the polymer composition) have density equal to or greater than corresponding compositions employing substantially saturated potassium brine. Thus, in accordance with certain especially preferred embodiments, aqueous polymer compositions of the invention employ the water soluble copolymer in a cesium formate brine or other suitable brine of cesium carboxylate, with at most only trace or minor amounts of other salts (i.e., such as might be contributed by sea water), and the cesium salt is used in an amount from about 40% to fully saturated.

In accordance with another aspect, there is provided the use of a polymer composition of the invention as a well service fluid, especially as a completion fluid, a work-over fluid or drilling fluid in a well-drilling operation. Preferably, the water soluble copolymer has a weight average molecular weight of at least about 1,000,000 preferably from 1,000,000 to 5,000,000, more preferably 1,500,000 to 3,000,000. In that regard, it is a significant advantage of the present invention, that at least preferred embodiments of the aqueous polymer compositions disclosed here provide well servicing fluids which develop high viscosity, i.e., have an improved and retained viscosity at temperatures up to at least 425° F. Moreover, it is a notable advantage of the present invention that such preferred embodiments retain their excellent viscosity characteristics at elevated temperature even after extended use as a completion or drilling fluid. In certain preferred embodiments, the copolymer is soluble in a saturated alkali metal carboxylate brine solution, e.g., is a substantially saturated cesium formate solution, in an amount of at least about 4 lbs/bbl, more preferably at least 6 lbs/bbl. Certain such preferred embodiments have retained viscosity at temperatures up to at least about 425° F. after 700 hours of extended use as a well service fluid, as tested and defined by "$_{13}$ *Recommended Practice Standard Procedure for Field Testing Water-Based Drilling Fluids*" API Recommended Practice 13B-1 (RP 13B-1) First Edition, Jun. 1, 1990 (American National Standard, ANSI/API RP 13B-1-90 Approved: Jul. 12, 1993). Certain such preferred embodiments employing the high molecular weight, water soluble copolymer described above in an amount of 0.05 to 5 wt. % (based on the total weight of all solids components of the polymer composition) and the alkali metal carboxylate in an amount of 95 to 99.95 wt. % (also based on the weight of all solids components) to produce a substantially saturated or other concentration brine, to provide a well-servicing fluid which develops an apparent viscosity greater than or equal to 20 cPs., a plastic viscosity of greater than or equal to 15 cPs, and a yield point of greater or equal to 5 lb./100 ft$^2$ when dissolved in alkali metal formate brine at a concentration of 2 pounds per barrel and measured at 120 degrees F. In accordance with certain highly preferred embodiments, the well-servicing fluid retains at least 50% of its apparent viscosity after roller aging for 30 days at 375 degrees F. and measured at 120 degrees F. Suitable water soluble copolymers can be prepared in accordance with the teachings of published European patent application No. EP 0068189, the entire disclosure of which is hereby incorporated by reference.

Figure 1:
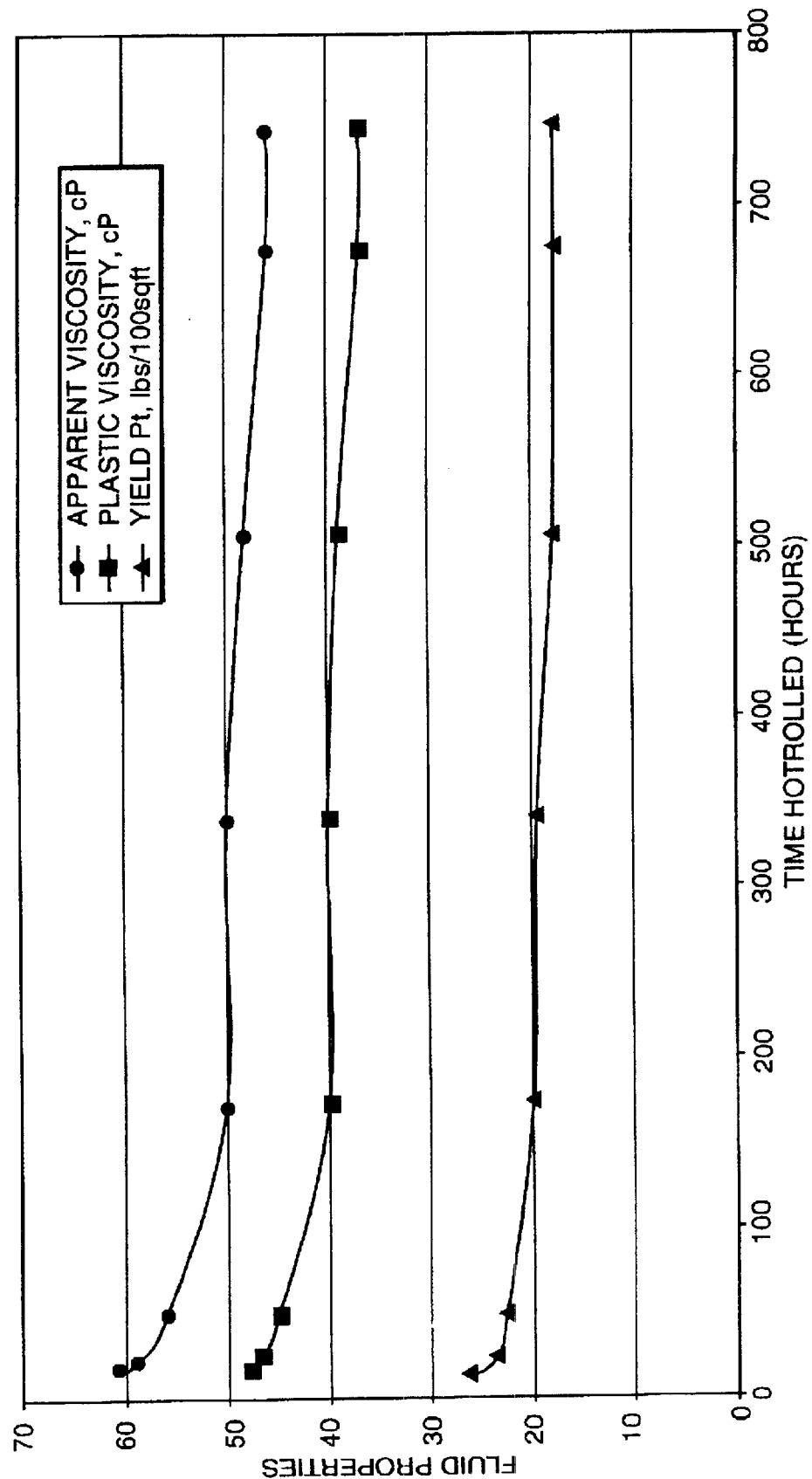
FIG. 1 is a graph showing fluid properties as a function of time (in hours) of hot rolling fluid in accordance with Example 1, below.

The alkali metal salt of carboxylic acid preferably is selected from the sodium, potassium and cesium salts of suitable carboxylic acids, preferably C1 to C3 carboxylic acid, most preferably the sodium, potassium and/or cesium salts of formic acid, acetic acid or mixtures thereof that are blended to obtain the desired density of the drilling, completion, workover or packer fluid. In accordance with certain preferred embodiments, substantially saturated brine of sodium formate sodium acetate, potassium formate and/or potassium acetate is used. In accordance with other preferred embodiments, the brine is a 40% w/w or high solution of cesium formate and/or cesium acetate. In accordance with certain highly-preferred embodiments, at least about 5 wt. % of the alkali metal salt of carboxylic acid is the cesium salt. Such embodiments are found to provide well service fluids having high density and unexpectedly advantageous density and durable viscosity. In that regard, the cesium brines at about 43% of saturation are found to provide densities equal to the density of substantially saturated potassium brines. At concentrations higher than 43%, the cesium brines advantageously provide even high densities, such as 2.18 to 2.3. As noted above, it is a significant and unexpected advantage of the polymer compositions disclosed here, that they are sufficiently water soluble to yield durable, high temperature viscosities suitable for well servicing fluids, in saturated brines of alkali metal carboxylates or in brines having salt concentrations less than saturation but sufficiently high to provide necessary density levels. It is significant and quite unexpected, for example, that the water soluble copolymers disclosed above, having a weight average molecular weight of 1,000,000 to 5,000,000 are soluble at least to levels of 0.05 to 5.0 wt. % (based on the weight of all solids contents of the polymer composition) in an 80% brine or higher of alkali metal carboxylate, yielding an apparent viscosity greater than or equal to 20 cPs., a plastic viscosity of greater than or equal to 15 cPs, and a yield point of greater or equal to 5 lb./100 ft$^2$ when dissolved in alkali metal formate brine at a concentration of 2 pounds per barrel and measured at 120 degrees F. Moreover, this advantageous viscosity is durable, in that the aqueous polymeric compositions retain at least 50% of its apparent viscosity after roller aging for 30 days at 375 degrees F. and measured at 120 degrees F. As discussed elsewhere herein, it should be understood that reference to a cesium brine means a brine in which cesium carboxylate is the only or the primary salt. Brines in which cesium carboxylate is the primary salt have only trace or minor amounts of other salts, such as would be introduced through the use of seawater in the polymer composition. Corresponding meanings apply for potassium brine, sodium brine. etc.

Preferably the water soluble copolymer is an AMPS copolymer prepared as the reaction product of 2-acrylamido-2-methylpropanesulfonic acid or salt thereof, that is 2-methyl-2-[(1-oxo-2-propenyl)amino]-1-propanesulfonic acid or salt thereof, with acrylic acid or salt thereof.

Optionally, a crosslinker reactant also is employed to achieve a higher molecular weight copolymer reaction product. Alternatively, reaction conditions may be controlled or other techniques employed to achieve a desired molecular weight without the use of a cross-linking agent. When used, the cross-linking agent should be at least bifunctional, such as N,N'-methylenebis[2-propenamide] . The water soluble copolymer preferably has about 5 to 95 wt. %, more preferably about 40 to 80 wt. % structural units derived from the 2-acrylamido-2methylpropanesulfonic acid or salt thereof, or like reactant, and about 5 to 95 wt. %, more preferably about 20 to 60 wt. % structural units derived from the acrylic acid or salt like reactant, and about 0 to 5 wt. %, more preferably about 0 to 0.1 wt. % structural units derived from cross-linking agent. Preferred salts of the copolymer include, for example, alkali metal salts, ammonium salts and the like.

An aqueous polymer composition suitable for use as a well service fluid, comprises the polymer composition described above together with water or brine solution in an amount preferably sufficient to substantially fully hydrate the water soluble copolymer and to dissolve the alkali metal salt of carboxylic acid.

In accordance with preferred embodiments, the water soluble copolymer is present in an amount of about 0.05 to 5.0 wt. %, based on the combined weight of all of the dry ingredients of the polymer composition period reference here to the dry ingredients means the undissolved salt(s), non-hydrated copolymer, and any other solids of the polymer composition in the absence of water. Typically, therefore, the dry ingredients will include the copolymer, alkali metal salt of carboxylic acid, the solids content of any additives. etc. The alkali metal salt in such preferred embodiments is present in an amount of about 95 to 99.95 wt. %, again based on the combined weight of the dry ingredients. These amounts are stated for the dry ingredients, not including the water content of any polymer compositions disclosed here which are aqueous polymer compositions.

The polymer compositions may further comprise other suitable ingredients, including for example, alkali metal salts of at least 1 halide. Thus, for example, the polymer compositions may incorporate the sodium, potassium and/or cesium salts of chloride, bromide or mixtures thereof. In addition, minor amounts of suitable additive may be present in the polymer compositions, including for example, any of the additives currently known for use in well servicing fluids of this general type.

The water soluble copolymer can be prepared in accordance with known polymerization techniques. Preferably, 2-acrylamido-2-methylpropanesulfonic acid or like AMPS reactant is polymerized together with acrylic acid or other suitable carboxylic acid, after which the resulting water soluble copolymer is optionally neutralized to the salt by addition of suitable ammonium, sodium or calcium compound or the like. It should be understood that the term water swellable and water soluble is used herein to include both the dry and the hydrated form of the copolymer, unless otherwise clearly indicated by context. As such, it will be recognized that the term water-soluble refers to the hydrophilic nature of the copolymer whether or not the polymer is in the hydrated form. It should also be recognized that the term acrylic acid is used here interchangeably with propanoic acid.

The invention will be further understood from the following illustrative Examples.

EXAMPLE I

To an 83% Cesium Formate (2.286 s.g.) solution buffered to pH 10.0 the copolymer disclosed above was added in the amount of 6 lb/bbl by the following procedure which substantially follows "Recommended Practice Standard Procedure for Field Testing Water-Based Drilling" API Recommended Practice 13B-1 (RP 13B-1) First Edition, Jun. 1, 1990 (American National Standard, ANSI/API RP 13B-1-90 Approved: Jul. 12, 1993). The procedure used commenced with weighing the required amount of dry polymer and the required amount of Cesium Formate solution. Then, using an Air mixer equipped with a 1.25 inch high efficiency paddle assembly the copolymer powder is slowly added to the Cesium Formate solution while mixing at medium speed. When all the powder is added the mixer speed is increased to approximately 4000 rpm. The sample is left mixing overnight. The sample is poured in a cup and the unaged viscosities are read using an OFITE Model 800 Viscometer. The sample is then poured into a stainless steel gas tight Aging Cell lined with Teflon cup. The Aging Cell is placed in a roller oven pre-heated to 375° F. The sample is hot rolled for 24 hrs; after 24 hours the sample is cooled down to 120° F. and the viscosities are read. The Apparent Viscosity, Plastic Viscosity and Yield Point of the AGED sample are then calculated. The sample is then poured back in the Aging cell and continually aged at 375° F. for the specified test period (i.e., 48, 96, 168, 336, 504, 672 and 744 hours). After each test period, the sample is cooled and the measurements conducted at 120° F. The results are tabulated below and shown in FIG. 1:

| | Time, hours | | | | | | | |
|---|---|---|---|---|---|---|---|---|
| Hot Rolled @ 375° F. | 16 | 24 | 48 | 168 | 336 | 504 | 672 | 744 |
| Apparent Viscosity, cP | 61 | 59 | 56.5 | 50 | 50 | 48 | 46 | 46 |
| Plastic Viscosity, cP | 48 | 47 | 45 | 40 | 40 | 39 | 37 | 37 |
| Yield Pt, lbs/100 sq ft | 26 | 24 | 23 | 20 | 20 | 18 | 18 | 18 |

EXAMPLE 2

Figure 2:
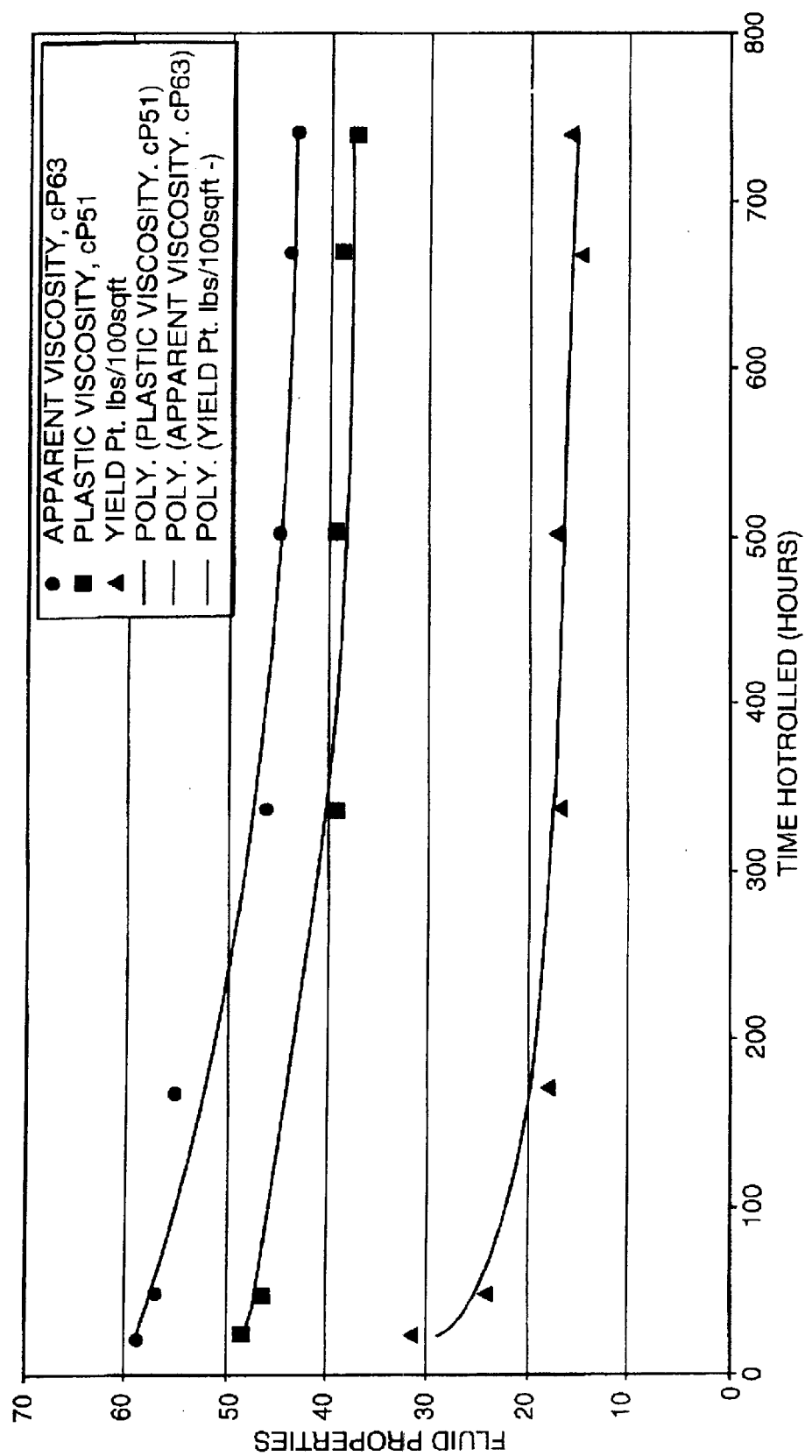
FIG. 2 is a graph showing fluid properties as a function of time (in hours) of hot rolling fluid in accordance with Example 2, below.

To a blend of Potassium Formate and Cesium Formate (1.88 s.g.) mixed in the ratio of 1:1.27 solution buffered to pH 10.0 the copolymer was added in the amount of 6 lb/bbl by following the same procedure as described in Example 1. The results of apparent viscosity, plastic viscosity and yield point were measured at time intervals. The time intervals and measurement results are tabulated below and shown in FIG. 2.

| | Time, Hours | | | | | | | |
|---|---|---|---|---|---|---|---|---|
| Hours Hot Rolled @ 375° F. | 16 | 24 | 48 | 168 | 336 | 504 | 672 | 744 |
| Apparent Viscosity, cP | 63 | 58 | 56 | 54.5 | 45.5 | 44.5 | 43.5 | 43 |
| Plastic Viscosity, cP | 51 | 48 | 46 | — | 39 | 39 | 38 | 37 |
| Yield Pt, lbs/100 sq ft | — | 31 | 24 | 18 | 17 | 17 | 15 | 16 |

We claim:

1. A composition comprising:

water soluble copolymer comprising form 5 to 95 wt. % structural units derived from acrylamidomethylpropanesulfonic acid or salt thereof, and from 5 to 95 wt. % structural units derived from acrylic acid or salt thereof; and at least one alkali metal salt C1 to C3 carboxylic acid.

2. A composition of claim 1 wherein the water soluble copolymer has 5 to 95 wt. % structural units derived from 2-acrylamido-2-methylpropanesulfonic acid or salt thereof, and 5 to 95 wt. % structural units derived from acrylic acid or salt thereof.

3. The polymer composition of claim 1 wherein the alkali metal salt is primarily cesium salt.

4. The polymer composition of claim 1 wherein the water soluble copolymer is present in an amount of 0.05 to 5 wt. % of the combined weight of all solids of the polymer composition and the alkali metal salt is present in an amount of 95 to 99.95 wt. % of the combined weight of all solids of the polymer composition.

* * * * *

UNITED STATES PATENT AND TRADEMARK OFFICE
CERTIFICATE OF CORRECTION

PATENT NO. : 6,423,802 B1
DATED : July 23, 2002
INVENTOR(S) : Miller et al.

It is certified that error appears in the above-identified patent and that said Letters Patent is hereby corrected as shown below:

Column 7,
Line 2, replace "form" with -- from --.
Line 7, after "salt" add -- of a --.

Column 8,
Line 3, delete "polymer".
Line 5, delete "polymer".

Signed and Sealed this

First Day of April, 2003

JAMES E. ROGAN
*Director of the United States Patent and Trademark Office*